Aug. 28, 1962 P. G. DOOLEY ET AL 3,050,942
PROPELLANT INJECTOR DEVICE
Filed June 24, 1959
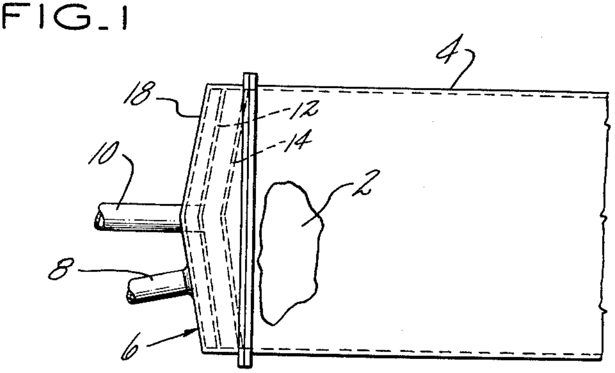
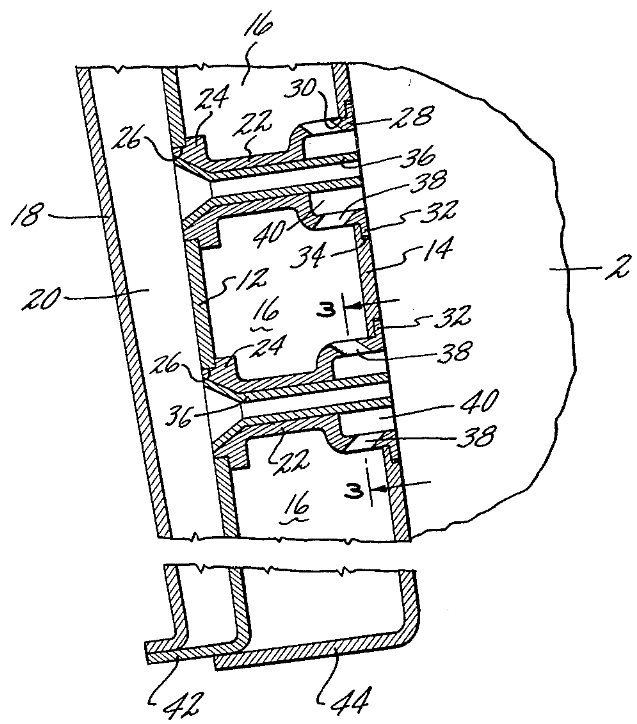
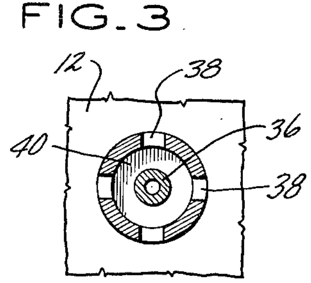
INVENTORS
PHILIP G. DOOLEY
ALBERT D. TINKELENBERG
BY Charles A. Warren
ATTORNEY 3,050,942
Patented Aug. 28, 1962

3,050,942

PROPELLANT INJECTOR DEVICE

Philip G. Dooley, Bolton, and Albert D. Tinkelenberg, Manchester, Conn., assignors to United Aircraft Corporation, Hartford, Conn., a corporation of Delaware Filed June 24, 1959, Ser. No. 822,608
2 Claims. (Cl. 60—39.46)

This invention relates to an injector for fluid propellants in a rocket system.

One feature of the invention is a construction of the injector elements such that the quantity of propellants delivered to the combustion chamber by each element may be accurately controlled. Another feature is an injector head made up of individual precision injector elements separately assembled within the injector head. Another feature is an injector head requiring a minimum of precision machining on the head itself.

One feature is an assembly permitting extensive variation in the number of injector elements utilized in an injector head such that the total amount of propellant injected may be varied from one assembly to another.

Other features and advantages will be apparent from the specification and claims, and from the accompanying drawing which illustrates an embodiment of the invention.

FIG. 1 is a side elevation of a rocket assembly with a part broken away.

FIG. 2 is an enlarged sectional view through a portion of the head.

FIG. 3 is a sectional view of a detail substantially along the line 3—3 of FIG. 2.

The invention is shown in conjunction with a rocket having a combustion chamber 2 defined by side walls 4 and a head 6. The latter has propellant inlets 8 and 10 and is so constructed that these propellants will be injected into the combustion chamber 2.

Referring now to FIG. 2, the injector head includes a main plate 12 and a second or inner plate 14 spaced from the plate 12 to form a chamber 16 therebetween. This chamber is supplied with a propellant through the inlet duct 10. A cap 18 spaced from and on the side of the plate 12 opposite to the plate 14 defines a chamber 20 with the plate 12 which is supplied with a second propellant through the inlet duct 8.

The propellants from the chambers 16 and 20 are delivered to the combustion chamber 2 through injector elements shown in detail in FIGS. 2 and 3. Each injector element includes a stem or hollow post 22 having a flanged head 24 at its upstream end fitting in an opening 26 in the plate 12 with the flange engaging the side wall of the plate, as shown. Adjacent the plate 14, the tube is enlarged to form a cup-shaped delivery end 28 fitting within an opening 30 in the plate 14 with a flange 32 on the rim of the cup engaging within a recess 34 surrounding the opening 30. The stem or post is suitably brazed within the plates 12 and 14. The plates are additionally held in the spaced relation shown by the posts after they are in position.

Positioned within the post 22 is a metering tube 36 which extends the entire length of the post with its downstream end terminating substantially in the plane of the downstream surface of the plate 14. Propellant from the chamber 20 flows through this metering tube and is discharged into the combustion chamber 2 through the downstream end of this tube.

The other propellant from the chamber 16 is delivered through slots or holes 38 in the side walls of the cup 28. These slots may extend at an acute angle to the axis of the post and, accordingly direct the propellant through the annular opening 40 defined between the tube 36 and the outer wall of the cup 28.

The size of the annular opening 40 may be controlled by controlling the dimension of the cup portion 28 of the post so that the opening 40 may function as a metering orifice.

In the manufacture of an injector head of this type, the plates 12 and 14 may be assembled, being in held in spaced apart relation, for example, by cooperating peripheral flanges 42 and 44 which may be suitably brazed together. Thereafter, the openings 26 and 30 may be formed by machining and the recess 34 may also be formed at the same time. Since these two openings are formed simultaneously after assembly of the plates 12 and 14, they will be in alignment to receive the injector elements. Obviously, the number and spacing of the elements will be determined by the number and spacing of the set of openings 26 and 30. The individual elements are then set in place and brazed to the plates, the flanges at opposite ends of the stem serving to locate the elements properly with respect to the two plates.

The elements themselves may be formed as precision elements independently of the injector head to be inserted within the injector head as complete elements. Accordingly, except for forming the openings 26 and 30, there is no precision machining necessary on the plates and all of the precision machine work is on the individual injector elements. Accordingly, in order to vary the relative flow between the two propellants in any particular injector head assembly, the only changes necessary are in the respective dimensions of the individual injector elements. For example, the propellant flows may be changed by varying the cross-sectional area of the tube 36 or the area of the openings 38 or the outer dimension of the cup portion 28 for controlling the orifice 40. Further, the total amount of propellants delivered in any one injector head assembly is also readily controlled by changing the number of these injector elements used in the head.

It is to be understood that the invention is not limited to the specific embodiment herein illustrated and described, but may be used in other ways without departure from its spirit as defined by the following claims.

We claim:

1. An injector head for introducing propellants into a rocket combustion chamber and mixing them therein including a main plate, a second plate at one side of and spaced from said main plate defining a first chamber therebetween, a cap on the other side of said main plate forming therewith a second chamber, said plates having a plurality of openings therein distributed over the plate areas, the openings in said plates being in alignment, injector elements extended between said plates at each set of aligned openings each injector element including a hollow post having a cup-shaped portion at one end and a flange at the other end, each of said elements having the rim of its cup-shaped end portion secured about an opening in said second plate with said rim flush with said plate opening at said combustion chamber and its flange secured about an aligned opening in said main plate, and a metering tube extended through the axial passage in said hollow post and concentric therewith having its upstream end terminating in said second chamber and its discharge end terminating substantially in the plane of the rim of said cup-shaped end portion, said cup-shaped portion having oblique passages through its side wall communicating with said first chamber and directed toward the discharge end of said metering tube, whereby mixing of said propellants takes place downstream of the discharge end of said metering tube in said combustion chamber.

2. In a rocket having a casing defining a combustion chamber, means for introducing propellants into the combustion chamber and mixing them therein including an injector head at one end of said chamber, said head including a main plate secured at its periphery to said casing, a second plate secured at its periphery to said casing at one side of said main plate and spaced from said main plate defining a first propellant chamber therebetween adjacent said combustion chamber, a cap for said casing on the other side of and spaced from said main plate forming a second propellant chamber between said cap and said main plate, said plates having a plurality of openings therein distributed over the plate areas, the openings in said plates being in alignment, an injector element extended between said plates at each set of aligned openings, each injector element including a hollow post having an enlarged cup-shaped portion at one end and an outstanding flange at its other end, each of said elements having the rim of its cup-shaped element secured about an opening in said second plate with said rim flush with the surface of said plate defining said combustion chamber and its flange secured about an aligned opening in said main plate, and means for discharging fluid propellant from said first and second propellant chambers into said combustion chamber for mixing in said latter chamber including a metering tube extending from said second propellant chamber through the axial passage in said post and concentric therewith and having its discharge end extended into said combustion chamber at least as far as the plane of said rims, and passageways extending obliquely through the sidewalls of said cup-shaped end portion communicating with said first propellant chamber and converging from all sides into the propellant stream issuing from said metering tube for mixing therewith in said combustion chamber.

References Cited in the file of this patent

UNITED STATES PATENTS

| | | |
|---|---|---|
| 2,405,785 | Goddard | Aug. 13, 1946 |
| 2,508,590 | Zucrow | May 23, 1950 |
| 2,711,630 | Lehman | June 28, 1955 |
| 2,741,085 | Prentiss | Apr. 10, 1956 |
| 2,946,185 | Bayer | July 26, 1960 |

FOREIGN PATENTS

| | | |
|---|---|---|
| 962,391 | Germany | Apr. 18, 1957 |

OTHER REFERENCES

Publication: "Rocket Encyclopedia Illustrated," by Herrick and Burgess, published by Aero Publishers, Inc., April 28, 1959, page 460 and Fig. 341 on page 461.